US009596285B2

(12) United States Patent
Kuwelkar et al.

(10) Patent No.: US 9,596,285 B2
(45) Date of Patent: Mar. 14, 2017

(54) METHODS AND SYSTEMS FOR AVB NETWORKS

(71) Applicant: Harman International Industries, Incorporated, Stamford, CT (US)

(72) Inventors: Heramb Kuwelkar, Fatorda Margao (IN); Lejin K. Joy, Bangalore (IN)

(73) Assignee: Harman International Industries, Incorporated, Stamford, CT (US)

( * ) Notice: Subject to any disclaimer, the term of this patent is extended or adjusted under 35 U.S.C. 154(b) by 114 days.

(21) Appl. No.: 14/484,172

(22) Filed: Sep. 11, 2014

(65) Prior Publication Data

US 2016/0080459 A1 Mar. 17, 2016

(51) Int. Cl.
| | |
|---|---|
| *G06F 15/16* | (2006.01) |
| *H04L 29/06* | (2006.01) |
| *H04N 21/2381* | (2011.01) |
| *H04N 21/242* | (2011.01) |
| *H04N 21/438* | (2011.01) |
| *H04N 21/647* | (2011.01) |
| *H04N 21/8547* | (2011.01) |

(52) U.S. Cl.
CPC ........ *H04L 65/608* (2013.01); *H04L 65/1069* (2013.01); *H04N 21/2381* (2013.01); *H04N 21/242* (2013.01); *H04N 21/4381* (2013.01); *H04N 21/64738* (2013.01); *H04N 21/8547* (2013.01)

(58) Field of Classification Search
CPC .............. H04L 9/3297; H04L 65/1069; H04N 21/64738; H04N 21/8547
USPC ........................................................ 709/231
See application file for complete search history.

(56) References Cited

U.S. PATENT DOCUMENTS

| | | | | |
|---|---|---|---|---|
| 2002/0018645 | A1* | 2/2002 | Nakamatsu | G11B 27/036 386/278 |
| 2004/0105659 | A1* | 6/2004 | Yamasaki | H04N 9/8042 386/344 |
| 2006/0184790 | A1* | 8/2006 | Oliveira | H04H 60/14 713/160 |
| 2011/0096828 | A1* | 4/2011 | Chen | H04N 21/23106 375/240.02 |

(Continued)

OTHER PUBLICATIONS

International Electrotechnical Commission, "IEC 61883-6, International Standard—Consumer Audio/Video Equipment—Digital Interface—Part 6: Audio and Music Data Transmission Protocol," Second Edition, Oct. 2005, 84 pages.

(Continued)

*Primary Examiner* — Phuoc Nguyen
(74) *Attorney, Agent, or Firm* — B. Anna McCoy; John D. Russell

(57) ABSTRACT

Embodiments are disclosed for a device for determining which packets of an audio/video stream include a valid presentation time. In some embodiments, a device comprises a communication interface communicatively connectable to another device and configured to transmit data, a processor, and a storage device that stores instructions executable by the processor to designate a sample of an audio/video stream as including a valid presentation time responsive to a sum of a number of data blocks that have been sampled since a last valid presentation time stamped data block and a number of data blocks in the sample being greater than or equal to a threshold value.

21 Claims, 7 Drawing Sheets

(56) References Cited

U.S. PATENT DOCUMENTS

| | | | |
|---|---|---|---|
| 2011/0231566 A1* | 9/2011 | Gelter | H04L 49/90 |
| | | | 709/231 |
| 2011/0239708 A1* | 10/2011 | Nishiura | C03B 17/064 |
| | | | 65/199 |
| 2013/0003757 A1* | 1/2013 | Boatright | H04J 3/0697 |
| | | | 370/474 |
| 2013/0246643 A1* | 9/2013 | Luby | H04N 21/23439 |
| | | | 709/231 |

OTHER PUBLICATIONS

IEEE Standards Association, "IEEE Std 802.1AS-2011, IEEE Standard for Local and Metropolitan Area Networks—Timing and Synchronization for Time-Sensitive Applications in Bridged Local Area Networks," Mar. 30, 2011, 292 pages.

IEEE Standards Association, "IEEE Std 1722-2011, IEEE Standard for Layer 2 Transport Protocol for Time-Sensitive Applications in Bridged Local Area Networks," May 6, 2011, 57 pages.

IEEE Standards Association, "IEEE Std 802.1BA-2011, IEEE Standard for Local and Metropolitan Area Networks—Audio Video Bridging (AVB) Systems," Sep. 30, 2011, 45 pages.

IEEE Standards Association, "IEEE Std 802.1Q-2011, IEEE Standard for Local and Metropolitan Area Networks—Media Access Control (MAC) Bridges and Virtual Bridge Local Area Networks," Aug. 31, 2011, 1365 pages. (Submitted in two parts).

Gunther, C., "SRP and its Use Within AVB Systems," Jun. 29, 2012, 4 pages.

"IEEE Standard for Layer 2 Transport Protocol for Time-Sensitive Applications in Bridged Local Area Networks; P1722a_D8," IEEE Draft; P1722A_D8, IEEE-SA, Piscataway, NJ USA, vol. 1722, No. D8, Apr. 2, 2014, 218 pages.

European Patent Office, Extended European Search Report Issued in Patent Application No. 15181313.6, Jan. 13, 2016, 9 pages.

* cited by examiner

METHODS AND SYSTEMS FOR AVB NETWORKS

FIELD

The disclosure relates to calculating valid presentation times in AVB networks and hibernating AVB systems.

BACKGROUND

Audio Video Bridging (AVB) is a networking protocol pertaining to streaming audio and/or video data via a network (e.g., an Ethernet network), described in IEEE 802.1 standards (e.g., IEEE802.1BA-2011, IEEE 802.1Q-2011, IEEE 802.1AS-2011, etc.). An AVB network may include one or more talkers (e.g., transmitters) and one or more listeners (e.g., receivers) for transmitting and receiving audio/video data according to the Audio/video transport protocol (AVTP), described in the IEEE 1722-2011 standard.

SUMMARY

In some AVB systems, listeners may be configured to play back media at a presentation time to ensure synchronization amongst the listeners. For example, such synchronization may ensure that audio data from a media item, played out via audio listener devices (e.g., audio playback devices), and video data from the media item, played out via video listener devices (e.g., video playback devices), are matched. In other examples, A/V data may be broadcast to multiple listeners via different routes having different delays. Presentation times may help to ensure that each listener plays back the data at the same time as each other listener. In still other example, A/V data may be provided to an array of audio listener devices (e.g., speakers). Utilizing presentation times, each speaker may be configured to output the A/V data at a particular time relative to other speakers in order to create a particular sound profile. It is to be understood that these examples are not exhaustive, and any suitable AVB network may utilize presentation times.

In each of the above described examples, presentation times may be carried within packets of audio/video data. However, some systems may only include valid presentation times in a subset of the audio/video data (e.g., in every x number of samples). Embodiments are disclosed for determining which packets of an A/V stream include a valid presentation time.

In some embodiments, a talker device for determining which packets of an audio/video stream include a valid presentation time includes a communication interface communicatively connected to a listener device and configured to transmit data to the listener device, a processor, and a storage device. The storage device stores instructions executable by the processor to acquire a sample of the audio/video stream, determine a number of data blocks in the sample, and perform a modulus operation of the total number of data blocks and an syt_interval value to determine a number of data blocks that have been sampled since a last valid presentation time stamped data block, the syt_interval value defining a number of data blocks between two successive valid presentation times in the audio/video stream. The instructions are further executable to designate the sample as including a valid presentation time responsive to determining that the sum of the number of data blocks that have been sampled since the last valid presentation time stamped data block and the number of data blocks in the sample is greater than or equal to the syt_interval value.

In some embodiments, a communication system includes a talker device including a transmission buffer for storing audio/video data blocks for transmission and a presentation time module including first instructions executable by a processor of the talker device to determine which of a plurality of data blocks in an audio/video stream are to be time stamped with a valid presentation time in an associated timestamp validation field (e.g., a timestamp_valid field). The communication system also includes a listener device communicatively connected to the talker device and configured to receive the audio/video stream from the talker device, the listener device comprising presentation time validation module including second instructions executable by a processor of the listener device to evaluate a timestamp_valid field for each packet of the audio/video stream to determine whether that packet includes a data block with a valid presentation time and present the audio/video stream in accordance with each determined valid presentation time.

According to some embodiments, a method for determining which packets of an audio/video stream transmitted from a talker device to a listener device include a valid presentation time may be performed by a talker of a communication system. The method includes acquiring a sample of the audio/video stream, determining a number of data blocks in the sample, and performing a modulus operation of the total number of data blocks and an syt_interval value to determine a number of data blocks that have been sampled since a last valid presentation time stamped data block, the syt_interval value defining a number of data blocks between two successive valid presentation times in the audio/video stream. The method further includes encapsulating the sample in a packet, and setting a timestamp_valid field of a header of the packet to a selected value designating the packet as including a valid presentation time responsive to determining that the sum of the number of data blocks that have been sampled since the last valid presentation time stamped data block and the number of data blocks in the sample is greater than or equal to the syt_interval value.

BRIEF DESCRIPTION OF THE DRAWINGS

The disclosure may be better understood from reading the following description of non-limiting embodiments, with reference to the attached drawings, wherein below.

DETAILED DESCRIPTION

As described above, a communication system may include talker and listener devices. The listener devices may receive audio/video streams from the talker devices and playback each received packet of the audio/video streams at a time designated by a presentation time indicated for that packet (e.g., within a header of the packet). However, a talker may not be configured to calculate a presentation time for each data block of the audio/video stream, which may result in packets that do not include a data block with a valid presentation time. In order to ensure that valid presentation times govern playback at the listener device, the talker device may determine whether a given packet includes a valid presentation time and set a flag in the header for that packet indicating the results of such a determination. The determination of which packets include a valid presentation time is described in more detail below.

Figure 1:
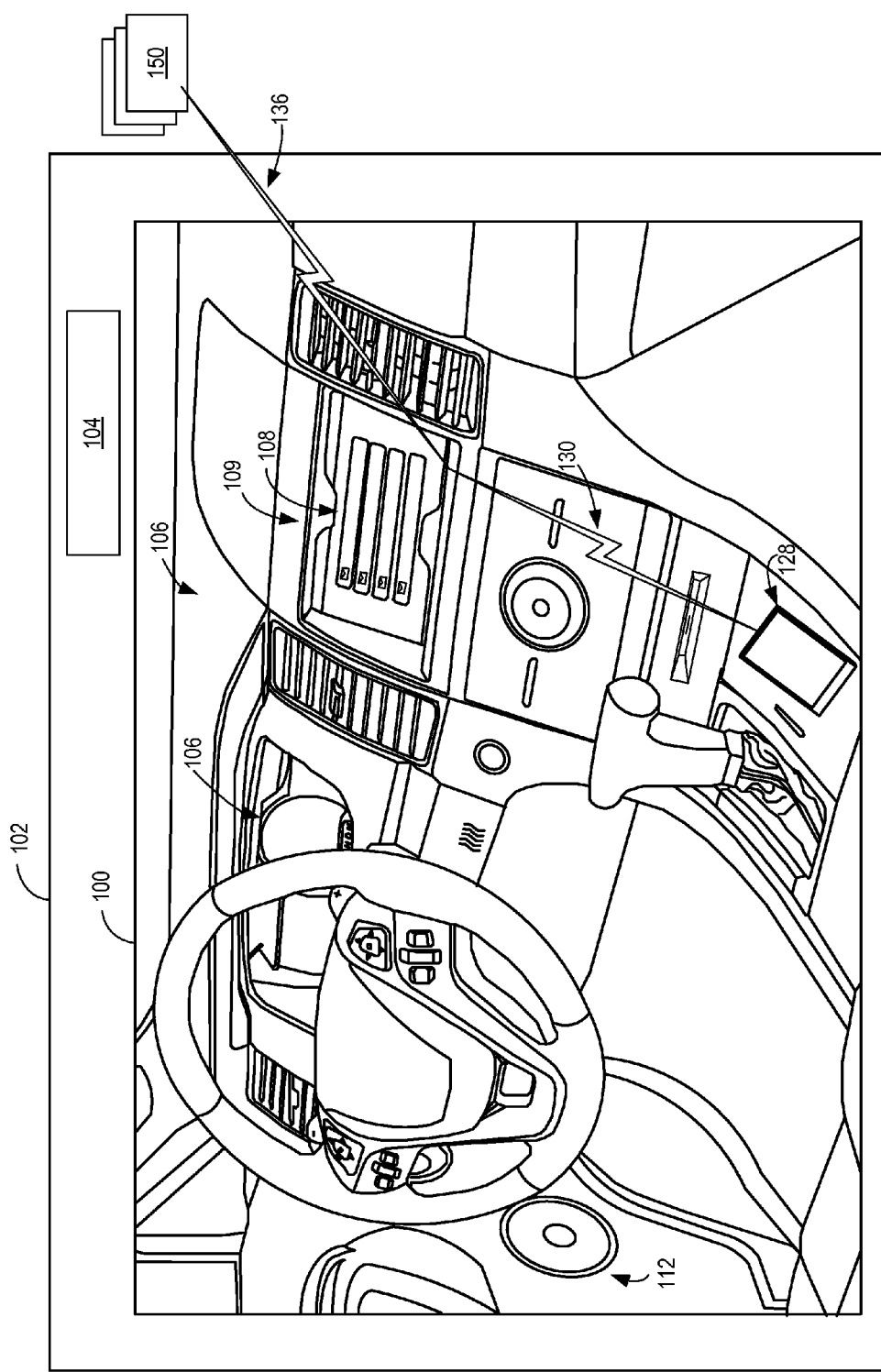
FIG. 1 shows an example partial view of a vehicle cabin in accordance with one or more embodiments of the present disclosure.

FIG. 1 shows an example partial view of one type of environment for a communication system: an interior of a cabin 100 of a vehicle 102, in which a driver and/or one or more passengers may be seated. Vehicle 102 of FIG. 1 may be a motor vehicle including drive wheels (not shown) and an internal combustion engine 104. Internal combustion engine 104 may include one or more combustion chambers which may receive intake air via an intake passage and exhaust combustion gases via an exhaust passage. Vehicle 102 may be a road automobile, among other types of vehicles. In some examples, vehicle 102 may include a hybrid propulsion system including an energy conversion device operable to absorb energy from vehicle motion and/or the engine and convert the absorbed energy to an energy form suitable for storage by an energy storage device. Vehicle 102 may include a fully electric vehicle, incorporating fuel cells, solar energy capturing elements, and/or other energy storage systems for powering the vehicle.

As shown, an instrument panel 106 may include various displays and controls accessible to a driver (also referred to as the user) of vehicle 102. For example, instrument panel 106 may include a touch screen 108 of an in-vehicle computing system 109 (e.g., an infotainment system), an audio system control panel, and an instrument cluster 110. While the example system shown in FIG. 1 includes audio system controls that may be performed via a user interface of in-vehicle computing system 109, such as touch screen 108 without a separate audio system control panel, in other embodiments, the vehicle may include an audio system control panel, which may include controls for a conventional vehicle audio system such as a radio, compact disc player, MP3 player, etc. The audio system controls may include features for controlling one or more aspects of audio output via speakers 112 of a vehicle speaker system. For example, the in-vehicle computing system or the audio system controls may control a volume of audio output, a distribution of sound among the individual speakers of the vehicle speaker system, an equalization of audio signals, and/or any other aspect of the audio output. In further examples, in-vehicle computing system 109 may adjust a radio station selection, a playlist selection, a source of audio input (e.g., from radio or CD or MP3), etc., based on user input received directly via touch screen 108, or based on data regarding the user (such as a physical state and/or environment of the user) received via external devices 150 and/or mobile device 128.

In some embodiments, one or more hardware elements of in-vehicle computing system 109, such as touch screen 108, a display screen, various control dials, knobs and buttons, memory, processor(s), and any interface elements (e.g., connectors or ports) may form an integrated head unit that is installed in instrument panel 106 of the vehicle. The head unit may be fixedly or removably attached in instrument panel 106. In additional or alternative embodiments, one or more hardware elements of the in-vehicle computing system may be modular and may be installed in multiple locations of the vehicle.

The cabin 100 may include one or more sensors for monitoring the vehicle, the user, and/or the environment. For example, the cabin 100 may include one or more seat-mounted pressure sensors configured to measure the pressure applied to the seat to determine the presence of a user, door sensors configured to monitor door activity, humidity sensors to measure the humidity content of the cabin, microphones to receive user input in the form of voice commands, to enable a user to conduct telephone calls, and/or to measure ambient noise in the cabin 100, etc. It is to be understood that the above-described sensors and/or one or more additional or alternative sensors may be positioned in any suitable location of the vehicle. For example, sensors may be positioned in an engine compartment, on an external surface of the vehicle, and/or in other suitable locations for providing information regarding the operation of the vehicle, ambient conditions of the vehicle, a user of the vehicle, etc. Information regarding ambient conditions of the vehicle, vehicle status, or vehicle driver may also be received from sensors external to/separate from the vehicle (that is, not part of the vehicle system), such as from sensors coupled to external devices 150 and/or mobile device 128.

Cabin 100 may also include one or more user objects, such as mobile device 128, that are stored in the vehicle before, during, and/or after travelling. The mobile device may include a smart phone, a tablet, a laptop computer, a portable media player, and/or any suitable mobile computing device. The mobile device 128 may be connected to the in-vehicle computing system via communication link 130. The communication link 130 may be wired (e.g., via Universal Serial Bus [USB], Mobile High-Definition Link [MHL], High-Definition Multimedia Interface [HDMI], etc.) or wireless (e.g., via BLUETOOTH, WI-FI, Near-Field Communication [NFC], cellular connectivity, etc.) and configured to provide two-way communication between the mobile device and the in-vehicle computing system. For example, the communication link 130 may provide sensor and/or control signals from various vehicle systems (such as vehicle audio system, climate control system, etc.) and the touch screen 108 to the mobile device 128 and may provide control and/or display signals from the mobile device 128 to the in-vehicle systems and the touch screen 108. The communication link 130 may also provide power to the mobile device 128 from an in-vehicle power source in order to charge an internal battery of the mobile device.

In-vehicle computing system 109 may also be communicatively coupled to additional devices operated and/or accessed by the user but located external to vehicle 102, such as one or more external devices 150. In the depicted embodiment, external devices 150 are located outside of vehicle 102 though it will be appreciated that in alternate embodiments, external devices may be located inside cabin 100. The external devices may include a server computing system, personal computing system, portable electronic device, electronic wrist band, electronic head band, portable music player, electronic activity tracking device, pedometer, smart-watch, GPS system, etc. External devices 150 may be connected to the in-vehicle computing system via communication link 136 which may be wired or wireless, as discussed with reference to communication link 130, and configured to provide two-way communication between the external devices and the in-vehicle computing system. For example, external devices 150 may include one or more sensors and communication link 136 may transmit sensor output from external devices 150 to in-vehicle computing system 109 and touch screen 108. External devices 150 may also store and/or receive information regarding contextual data, user behavior/preferences, operating rules, etc. and may transmit such information from the external devices 150 to in-vehicle computing system 109 and touch screen 108.

In-vehicle computing system 109 may analyze the input received from external devices 150, mobile device 128, and/or other input sources and select settings for various in-vehicle systems (such as climate control system or audio system), provide output via touch screen 108 and/or speakers 112, communicate with mobile device 128 and/or external devices 150, and/or perform other actions based on the assessment. In some embodiments, all or a portion of the assessment may be performed by the mobile device 128 and/or the external devices 150.

In some embodiments, one or more of the external devices 150 may be communicatively coupled to in-vehicle computing system 109 indirectly, via mobile device 128 and/or another of the external devices 150. For example, communication link 136 may communicatively couple external devices 150 to mobile device 128 such that output from external devices 150 is relayed to mobile device 128. Data received from external devices 150 may then be aggregated at mobile device 128 with data collected by mobile device 128, the aggregated data then transmitted to in-vehicle computing system 109 and touch screen 108 via communication link 130. Similar data aggregation may occur at a server system and then transmitted to in-vehicle computing system 109 and touch screen 108 via communication link 136/130.

In the example environment illustrated in FIG. 1, the in-vehicle computing system 109 may be connected to one or more vehicle systems, such as speakers 112, display 108, vehicle sensors, and/or other suitable vehicle systems via any suitable network. In some examples, the in-vehicle computing system 109 includes a talker device configured to transmit audio/video data to listener devices, such as speakers 112 and display 108 via a network. The network may be configured in accordance with Layer 2 of the Open Systems Interconnection (OSI) model, in which routing and forwarding decisions or determinations in the network may be performed on a media access control (MAC) addressing basis. An example Layer 2 network may be an Ethernet Audio/Video Bridging (AVB) network. For Layer 2 networks configured as AVB networks, the talkers 130, 131 and the listeners 140, 141 may be configured to communicate over the AVB network 110 using various AVB standards and protocols, including the Institute of Electrical and Electronics Engineers (IEEE) 802.1AS-2011 (gPTP) for network timing and synchronization, IEEE 802.1Q-2011 clause 34 for queuing and forwarding streaming data, IEEE 802.1Q-2011 clause 35 (Stream Reservation Protocol (SRP)) for reserving a network connection or path and/or resources such as bandwidth for communication over the network connection, and/or IEEE 1722-2011 related to a possible data streaming format. Other AVB-related standards and protocols, and/or other versions of the AVB standards and protocols, previously, currently, or later developed, may also or alternatively be used.

The in-vehicle computing system may stream audio/video data based on information stored in local storage and/or audio/video data received from mobile device 128 and/or external device(s) 150. Presenting the audio/video data via the speakers 112 and display 108 in accordance with a valid presentation time included in selected packets of the audio/video data stream may ensure that the audio output at the speakers matches the video output at the display (e.g., without lip-sync error that arises from audio that leads video and/or video that leads audio).

It is to be understood that FIG. 1 depicts one example environment, however the communication systems and methods described herein may be utilized in any suitable environment. As another example, speakers in a professional audio environment (e.g., an arena, stadium, concert hall, amphitheater, recording studio, etc.) may be utilized as listeners that receive audio data from a talker device (e.g., a mixing console, audio/video receiver, etc.) over an AVB network. Any suitable devices that transmit and/or receive packets having a presentation time may be utilized as the systems and/or to perform the methods described herein.

Figure 2:
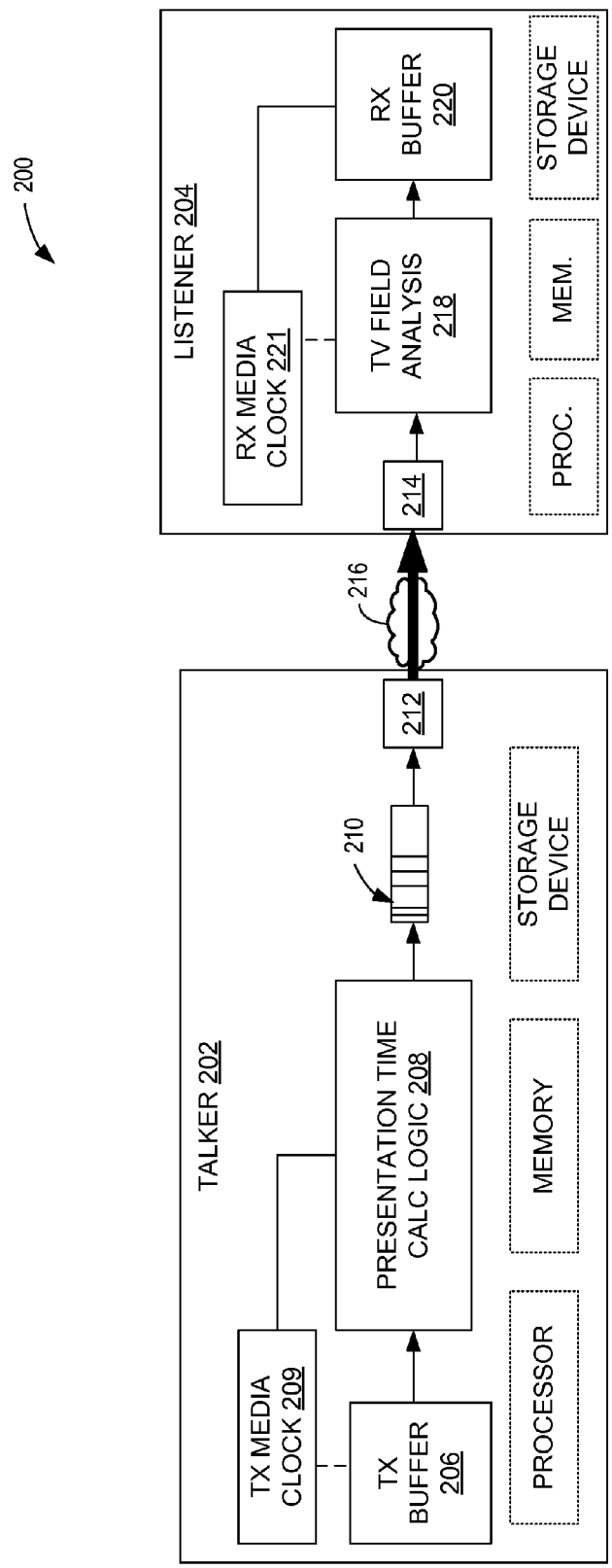
FIG. 2 shows an example communication system in accordance with one or more embodiments of the present disclosure.
Figure 3:
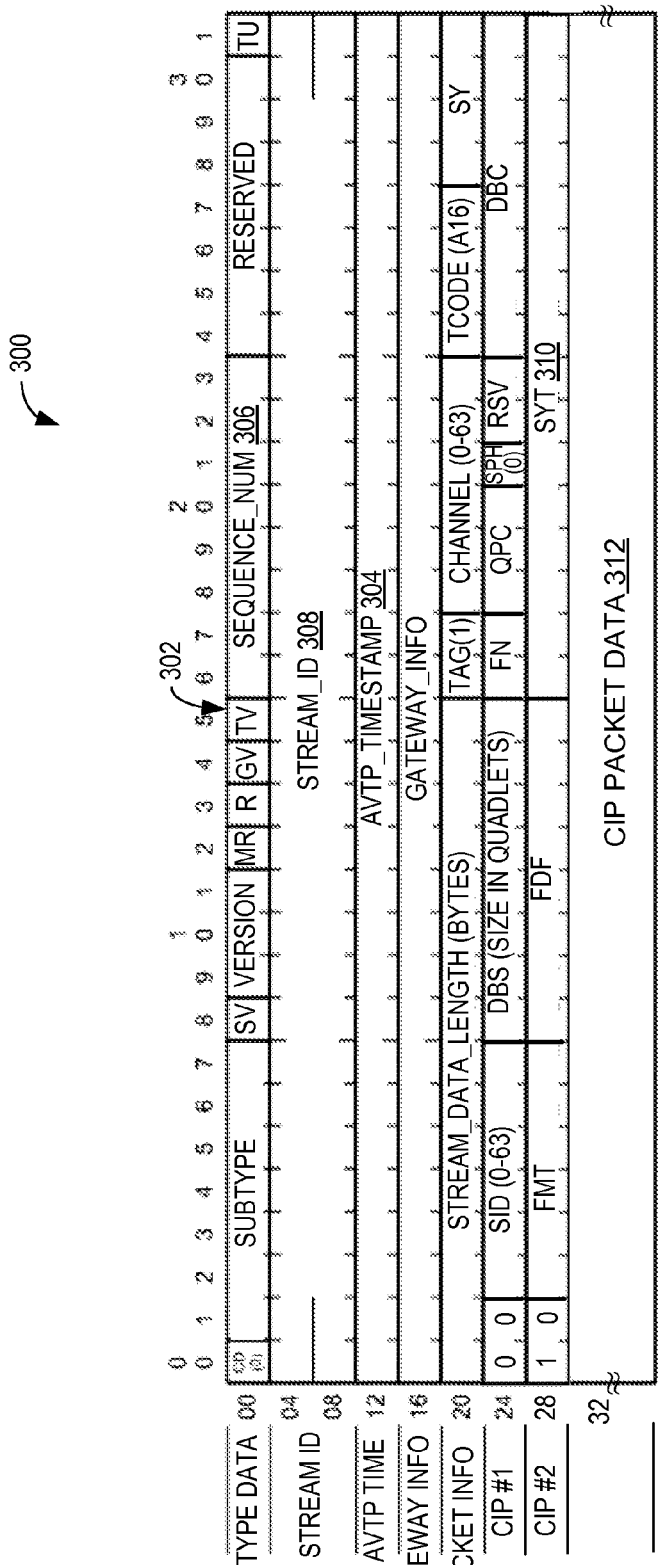
FIG. 3 shows an example packet structure in accordance with one or more embodiments of the present disclosure.

FIG. 2 is an example communication system 200 including a talker 202 and a listener 204. As described above, talker 202 may be any suitable device for sending an audio/video stream to listener 204 and listener 204 may be any suitable device for receiving and playing back the audio/video stream. For example, talker 202 may correspond to in-vehicle computing system 109 and listener 204 may correspond to speakers 112 and/or display 108 of FIG. 1. As illustrated, talker 202 may include a transmission buffer 206 configured to store data blocks of an audio/video stream. For example, if the audio/video stream is supplied from an external device (e.g., external device 150 and/or mobile device 128 of FIG. 1), the received data may be stored in transmission buffer 206 until the data is ready to be processed by presentation time calculation logic 208. Presentation time calculation logic may be a module including instructions executable by a processor of talker 202 for determining if a sample received from transmission buffer 206 is to include a data block with a valid presentation time stamp, and, if so, calculating the presentation time for that data block and setting a timestamp_valid field to 1 (and/or another suitable value to indicate that the presentation time in that packet is valid). The presentation time may be calculated based on a clock signal from transmission media clock 209. Methods for determining whether to include a valid presentation time and calculating the presentation time are described below with respect to FIGS. 4 and 5. The presentation time calculation logic 208 and/or another suitable module of talker 202 (e.g., a packetizer, communication interface 212, etc.) may encapsulate each sample in a packet 210 including header information indicating a presentation time and a validity of the presentation time. An example packet structure is illustrated in FIG. 3 and described in more detail below.

The packet 210 may be transmitted from talker 202 (e.g., via a talker communication interface 212) to a listener 204 (e.g., via a listener communication interface 214) over a network (e.g., an AVB network 216). Accordingly, talker communication interface 212 and listener communication interface 214 may be configured to communicate via an AVB network (e.g., via the audio/video transport protocol, AVTP). Packet 210, as received at listener 204, may be provided to a timestamp_valid (TV) field analysis module 218. TV field analysis module 218 may include instructions executable by a processor of listener 204 to evaluate the header of received packets (e.g., of packet 210) to determine a value of a timestamp_valid field. If the timestamp_valid field is set to 1 or another suitable value indicating that the presentation time included in that packet is valid, the packet is stored at receive buffer 220 in an index that is based on the presentation time included in the packet. Otherwise, the presentation time may be ignored for that packet. In such examples, the packet may be stored at an index that is selected based on a last received valid presentation time (e.g., a next empty index). Additionally or alternatively, the packet may be discarded and/or stored in a default location in the receive buffer 220 responsive to a determination that the presentation time included in the header for that packet is not valid. The listener 204 may play out audio/video data from receive buffer 220 based on the index at which each data block is stored and/or when a receive media clock 221 of the listener reaches the presentation time indicated for a given data block.

In some examples, the presentation time may be utilized to synchronize the receive media clock 221 with the transmission media clock 209. For example, if the network delay (e.g., the max transit time) is known by both the talker and the listener, the listener may compare a receive time with an expected receive time (e.g., based on a known transmission delay and the presentation time) and adjust the receive media clock based on a calculated error (e.g., the difference between the measured receive time and the expected receive time).

It is to be understood that one or more of the components of talker 202 and listener 204 may include and/or be included in a processor and/or storage device of talker 202 and listener 204. For example, although a processor/memory/storage device is illustrated separately within talker 202 and listener 204, it is to be understood that transmission buffer 206 may include at least a portion of a storage device of talker 202, and presentation time calculation logic 208 may include instructions stored in the storage device of talker 202 and/or a processor for executing the instructions stored in the storage device of talker 202. Likewise, receive buffer 220 may include at least a portion of a storage device of listener 204, and TV field analysis module 218 may include instructions stored in the storage device of listener 204 and/or a processor for executing the instructions stored in the storage device of listener 204.

FIG. 3 illustrates an example packet 300 including a timestamp_valid field (e.g., "TV" field 302) and a presentation time (e.g., AVTP_TIMESTAMP field 304). For example, packet 300 may illustrate an example structure of packet 210 of FIG. 2. Other fields of note may include the SEQUENCE. NUM field 306, which may indicate a place of the packet in the audio/video stream (e.g., how many packets were sent before that packet in the current audio/video stream). STREAM. ID field 308 may indicate an identifier for the stream, which designates the stream to which the packet belongs. As described above, AVTP_TIMESTAMP field 304 indicates a time at which the packet is to be played back (e.g., a real time and/or a time that is reachable by a media clock of a listener). SYT field 310 may indicate a SYT_INTERVAL, which denotes the number of data blocks between two successive valid AVTP_TIMESTAMP fields. CIP PACKET DATA field 312 may include the payload of the packet (e.g., while each of the other fields illustrated in FIG. 3 and/or described above make up the header of the packet). For example, CIP PACKET DATA field 312 may include the audio/video data blocks/samples to be played back at the time indicated in the AVTP_TIMESTAMP field 304.

Figure 4:
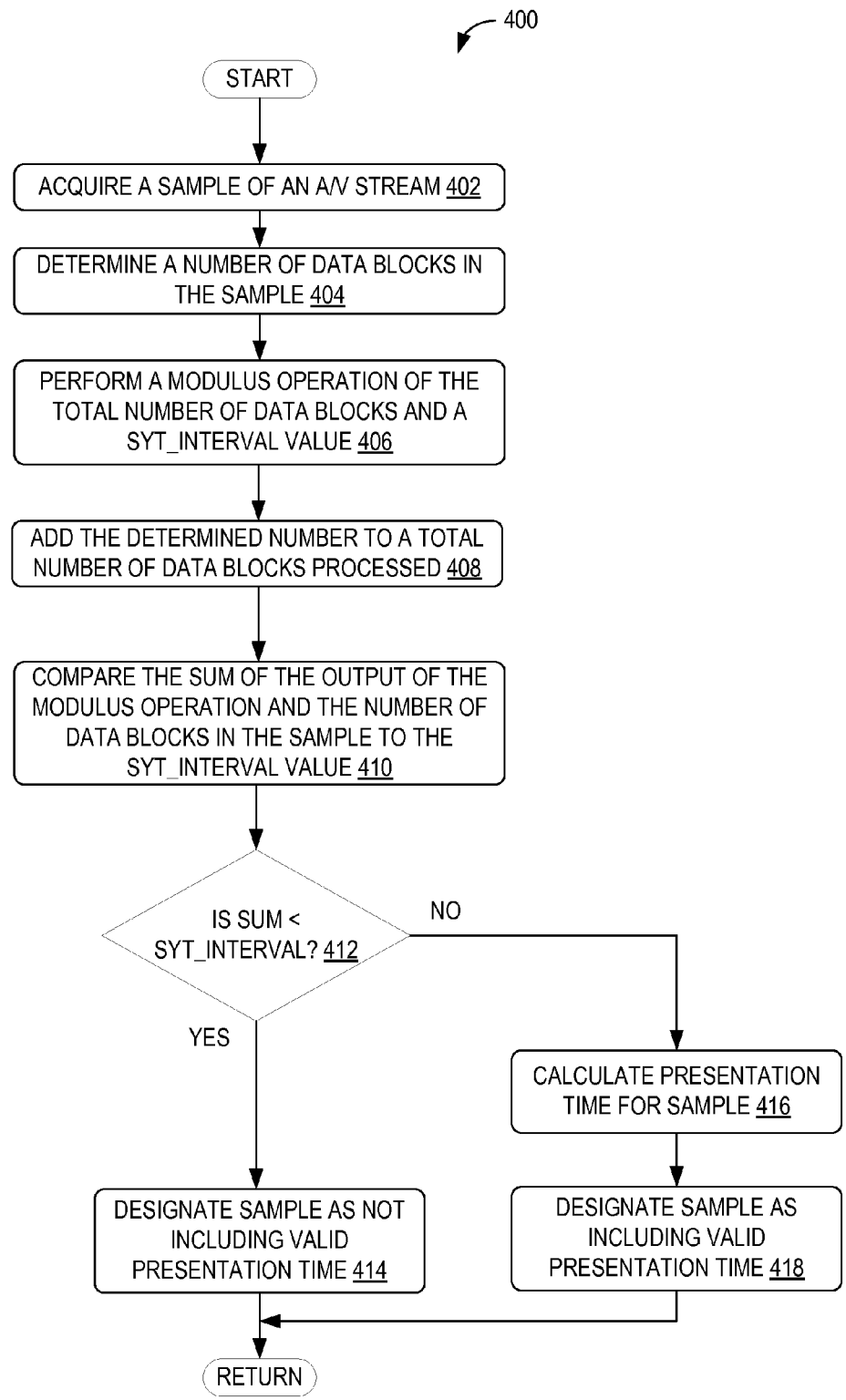
FIG. 4 is a flow chart for an example method of determining which samples are to include valid presentation time stamps in accordance with one or more embodiments of the present disclosure.

FIG. 4 is a flow chart of a method 400 for determining whether a packet is to include a valid presentation time. For example, method 400 may be performed by talker 202 (e.g., by presentation time calculation logic 208) of FIG. 2. At 402, method 400 includes acquiring a sample of an audio/video stream. A talker may be configured to sample data at a particular rate and transmit data at a particular rate (e.g., based on a class of traffic for that talker/the network over which the talker communicates). Accordingly, a sample of an audio/video stream that is to be transmitted may include all data associated with a sample period (e.g., all channels of audio/video data that were captured during the sample period and that are associated with events that occurred during the time that is captured by the sample period). At 404, method 400 includes determining a number of data blocks in the sample. A data block may include all data associated with events that happened at a particular instant in time, thus the number of data blocks may vary based on the length of the sample period (which may be based on the sampling rate/traffic class, as described above). For example, at a 48 kHz sample rate and a Class A transmit rate, a given sample may include 6 data blocks.

At 406, method 400 includes performing a modulus operation of a total number of data blocks (e.g., a total number of data blocks included in all previously acquired samples of the audio/video stream) and a SYT_INTERVAL value. As described above, the SYT_INTERVAL value may indicate the number of data blocks between two successive valid AVTP_TIMESTAMP fields (e.g., between two successive presentation time designations). Using the example of 48 kHz of class A traffic described above, the SYT_INTERVAL value would be 8, meaning that every $8^{th}$ data block has a valid timestamp associated thereto. In another example, class B traffic may have a SYT_INTERVAL of 64, meaning that every $64^{th}$ data block has a valid timestamp associated thereto. At 408, method 400 includes adding the number of data blocks in the sample to a total number of data blocks processed for that stream.

Figure 7:
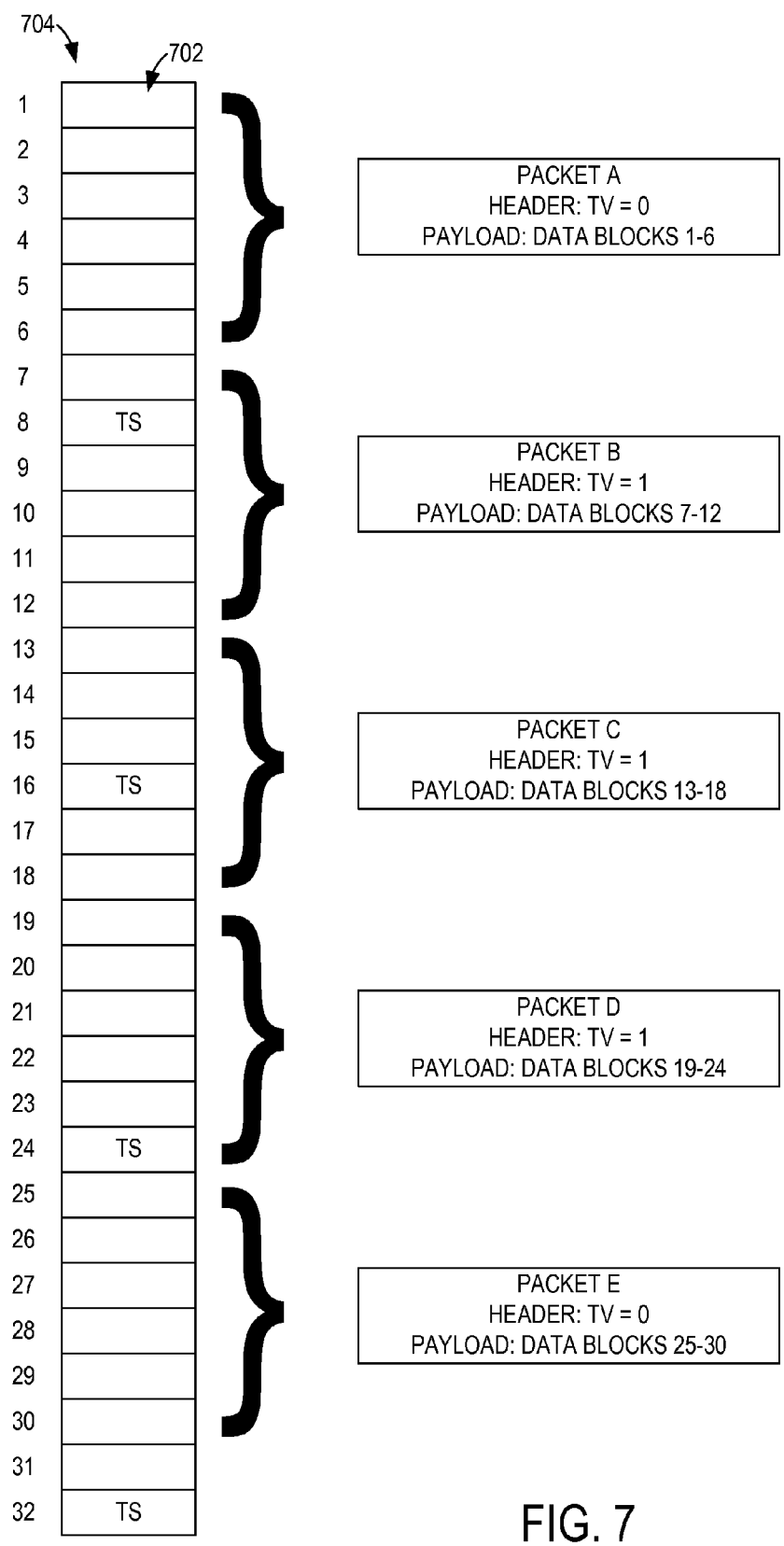
FIG. 7 shows example packet header information for packets including data blocks of an audio video stream in accordance with one or more embodiments of the present disclosure.

Performing the modulus operation indicated at 406 enables the determination of whether a valid presentation time is to be included for the acquired sample by comparing the sum of the output of the modulus operation and the number of data blocks in the sample to the SYT_INTERVAL value, as indicated at 410. For example, turning briefly to FIG. 7, if each sample includes 6 data blocks 702 of the audio/video stream 704, and an SYT_INTERVAL value is 8 (e.g., every eight block has a valid timestamp), then the modulus operation performed for a first sample of the data (e.g., where the total number of data blocks already processed is 0) would be 0 (the remainder when dividing 0 by 8). The sum of the output of the modulus operation (0) and the number of data blocks in the sample (6) would be 6. In this example, the output of the module operation would be less than the SYT_INTERVAL VALUE (8), so the sample would not have a valid timestamp associated therewith. Accordingly, as illustrated in FIG. 7, packet A, formed from data blocks 1-6, includes a timestamp_valid (TV) field value of 0 in the packet header. However, for a second sample using the same example parameters described above, the modulus of the total number of data blocks already processed (6) and the SYT_INTERVAL (8) would be 6, so the sum of the output of the modulus operation (6) and the number of data blocks in the sample (6) would be 12. As 12 is greater than 8, the second sample would have a valid timestamp associated therewith. This is illustrated with respect to packet B in FIG. 7. As shown, data block 8 has a valid time stamp and is included in the data blocks encapsulated as packet B. Accordingly, a TV field in the head of packet B is set to 1. Similar results are achieved with respect to packets C-E in FIG. 7

Returning to FIG. 4, method 400 includes determining if the sum of the output of the modulus operation and the number of data blocks in the sample is less than the SYT_INTERVAL, as indicated at 412. If the sum is less than the SYT_INTERVAL ("YES" at 412), the method proceeds to 414 to designate the sample as not including a valid presentation time. For example, an AVTP_TIMESTAMP_VALID (TV) field of a packet including the sample may be set to 0 to indicate that any timestamp for that packet is not a valid presentation time and the presentation time may not be calculated for that packet. Conversely, if the sum is greater than or equal to the SYT_INTERVAL ("NO" at 412), the method proceeds to 416 to calculate a presentation time for the sample. After calculating the presentation time for the sample, the method proceeds to 418 to designate the sample as including a valid presentation time. For example, an AVTP_TIMESTAMP_VALID (TV) field of a packet including the sample may be set to 1 to indicate that the timestamp for that packet (e.g., the AVTP_TIMESTAMP field in the head of that packet) is a valid presentation time.

Figure 5:
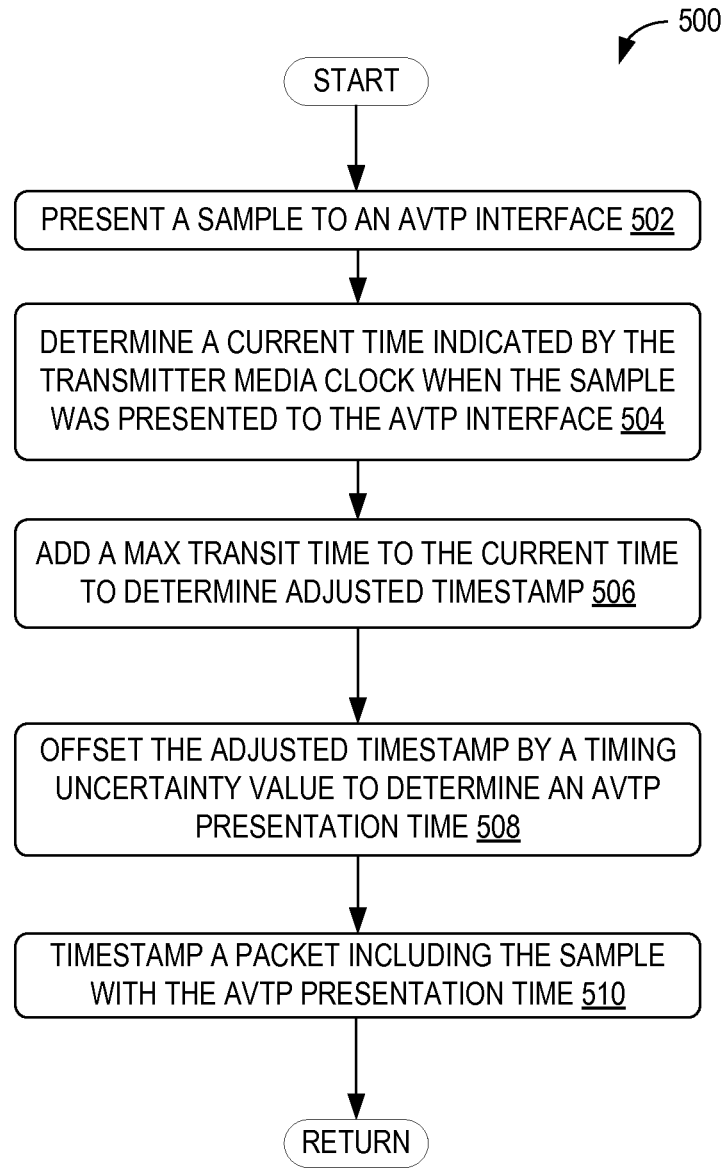
FIG. 5 is a flow chart for an example method of determining a presentation time stamp in accordance with one or more embodiments of the present disclosure.

FIG. 5 is a flow chart for a method 500 for calculating a presentation time for a sample. At 502, the method includes presenting a sample to an AVTP interface. For example, the AVTP interface may include transmitter communication interface 212 of FIG. 2. At 504, the method includes determining a current time indicated by a transmitter media clock when the sample was presented to the AVTP interface. For example, a clock signal from transmitter media clock 209 of FIG. 2 may be utilized to determine a local time at which the sample was presented to the AVTP interface. At 506, method 500 includes adding a max transit time to the current time to determine an adjusted timestamp. In some embodiments, the max transit time may include a worst case delay based on the communication network and/or the communication link(s) between the talker and the listener(s) for a given audio/video stream. In some examples, the worst case delay may be a longest delay in the network/to a listener based on current traffic, historical data, user settings, etc.

At 508, method 500 includes offsetting the adjusted timestamp by a timing uncertainty value to determine an AVTP presentation time. In some examples, a timing uncertainty value may be provided for a given audio/video stream and/or defined for a talker/listener/network/etc. At 510, the method includes time stamping a packet including the sample with the determined AVTP presentation time. For example, the AVTP_TIMESTAMP field 304 of FIG. 3 may include this determined AVTP presentation time. As described above with respect to FIG. 4, the presentation time may only be determined responsive to determining that the sample has a valid timestamp associated therewith. For example, method 500 may be performed at 416 of FIG. 4.

The electronic devices that communicate data streams in the above-described examples may first establish a reservation for the data stream communication. Upon startup, the devices may attain a link status, which enables the devices to communicate with peer nodes or devices in the system. After link status is attained, the devices may be initialized with a reservation protocol. For Audio-Video Bridging networks, the reservation protocol may be Stream Reservation Protocol (SRP). The initialization process may include a domain negotiation in which domain packets may be communicated with peer nodes. After the initialization process is performed, the devices may establish a reservation for the data stream communication. The reservation may be a reservation for a network path through the network and/or for network resources such as bandwidth, which may be guaranteed during communication of the data stream. Where a reservation protocol is used, messages may be communicated between the talkers and the listeners (e.g., through bridges) in accordance with the reservation protocol to establish the reservation. Once the reservation is established, the data stream may be communicated over the network. However, this process may increase the amount of time a device takes to start up after a power down event (e.g., a device shut down, entrance into a low power/sleep mode, etc.). In order to decrease this time, the device may instead enter a hibernate mode in which communication parameters are stored, removing the need to re-establish communication paths in conditions where the parameters associated with such communication are unchanged from a last high/full power/normal operating state.

Figure 6:
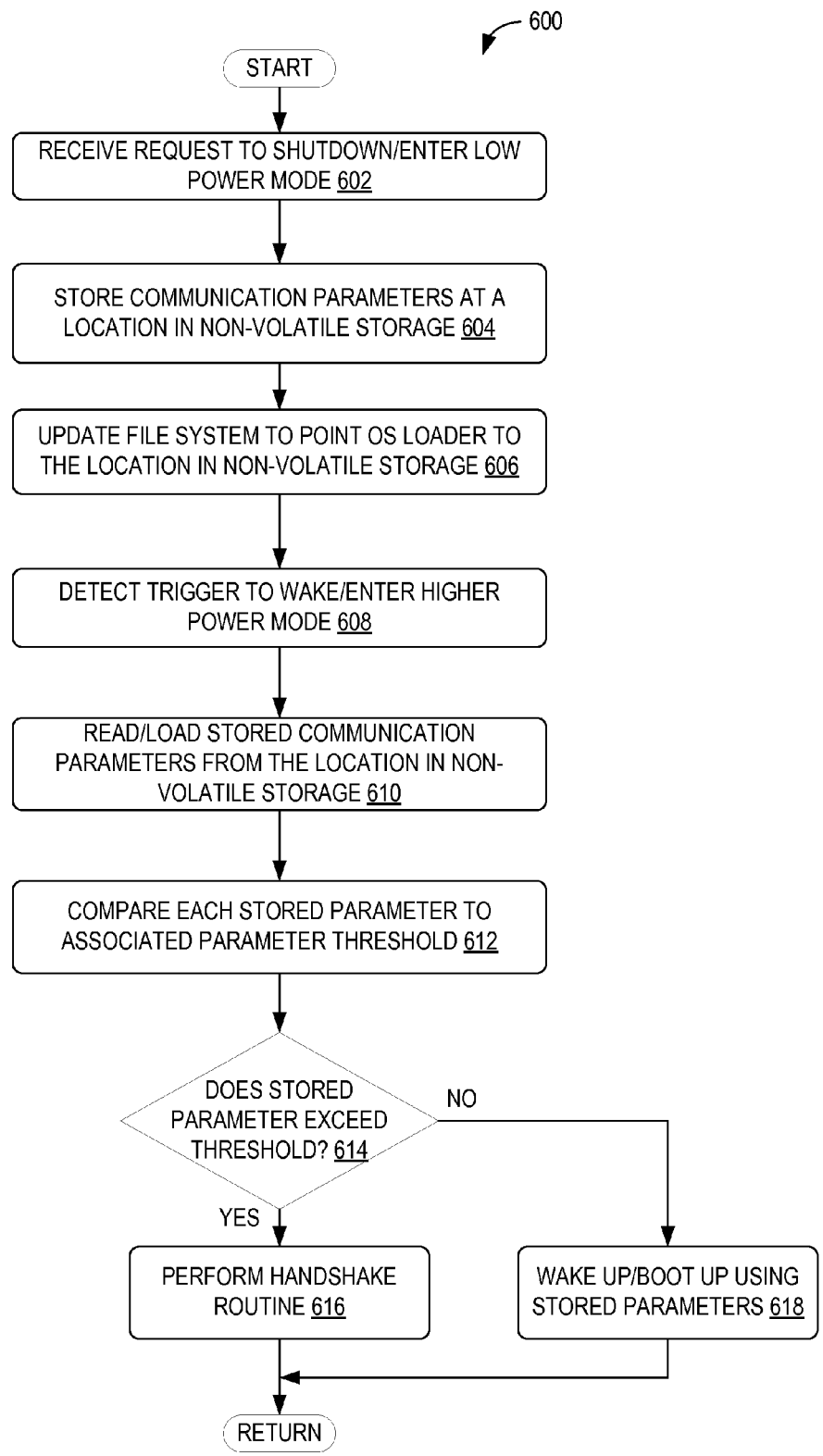
FIG. 6 is a flow chart for an example method of entering and exiting a hibernation mode in accordance with one or more embodiments of the present disclosure.

FIG. 6 is a flow chart of an example method 600 for hibernating an AVB communication device. For example, method 600 may be performed by talker 202 and/or listener 204 of FIG. 2 in some examples to provide fast boot up times after a shut down or power down event. At 602, method 600 includes receiving a request to shut down and/or otherwise enter a low power state (e.g., a suspend state, a hibernate state, a power conservation state, and/or any other suitable state that requires less power than the current state of the device). At 604, method 600 includes storing initial configuration and transient communication parameters in non-volatile memory responsive to receiving a request to enter a lower power mode and prior entering the lower power mode. The initial configuration and transient communication parameters may include group precision time protocol (gPTP) and stream reservation protocol (SRP) parameters corresponding to the talker device, the listener device, and/or the network over which the talker device and the listener device communicate in some embodiments. For example, the initial configuration and transient communication parameters may include Link_Delay, Neighbor_Rate_Ratio, Rate_Ratio, PortAsCapable, Initial_Log_Delay_Request_Interval, Initial_Log_Sync_Interval, and/or any other suitable parameters.

At 606, the method includes updating the file system to point the operating system loader to the location in non-volatile storage in order to enable the system to read from that location during a next power up event. After updating the file system, and/or storing the parameters, the system may proceed to power down to enter the state requested at 602. At 608, method 600 includes detecting a trigger to wake and/or other enter a higher power mode than a current mode (e.g., a boot up request). At 610, method 600 includes reading the stored initial configuration and transient communication parameters from the non-volatile memory responsive to detecting the trigger to enter a higher power mode at 608.

At 612, method 600 includes comparing each of the stored initial configuration and transient communication parameters to an associated parameter threshold. For example, each communication parameter may have a threshold associated therewith. At 614, method 600 includes determining whether a stored parameter exceeds a threshold. If a stored parameter (or a threshold number of parameters) exceeds (or otherwise crosses a threshold limit) an associated parameter threshold, the method proceeds to 616 to perform a handshaking routine with the listener to acquire one or more new initial configuration and transient communication parameters. For example, the handshaking routing may include performing a Stream Reservation Protocol (SRP) handshake, executing a group Precision Time Protocol (gPTP) Best Master Clock Algorithm (BMCA), performing a gPTP link delay calculation, and/or performing other suitable start up routines before streaming audio/video data and after detecting the trigger, in some embodiments. Otherwise, if no stored parameters (or fewer than a threshold number of stored parameters) exceed an associated parameter threshold (e.g., "NO" at 614), the method continues to 618 perform the wake up routine utilizing the stored communication parameters.

As described above, a talker may not be configured to calculate a presentation time for each data block of the audio/video stream, which may result in packets that do not include a data block with a valid presentation time. Determining presentation times for selected packets and setting a valid presentation time flag for the selected packets may ensure that valid presentation times govern playback at the listener device. Further, by entering a hibernation mode at a shut down or low power event, systems which benefit from fast load up times (e.g., automotive systems) may take advantage of infrequently changing network parameters by storing the network parameters then reloading the parameters at a start up event, thereby foregoing lengthy handshake routines and decreasing start up times.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as the in-vehicle computing system 109 and/or talker 202/listener 204 described with reference to FIGS. 1 and 2. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects. The following claims particularly point out subject matter from the above disclosure that is regarded as novel and non-obvious.

The invention claimed is:

1. A device comprising:
    a communication interface communicatively connectable to another device and configured to transmit data;
    a processor; and
    a storage device that stores instructions executable by the processor for:
        validating a presentation time of a sample of an audio/video stream responsive to a sum of a number of data blocks that have been sampled since a last valid presentation time stamped data block and a number of data blocks in the sample being greater than or equal to a threshold value; and
        designating the sample of the audio/video stream as including a valid presentation time by setting a field of the sample to a selected value based on the validating.

2. The device of claim 1, wherein the sum is the sum of all data blocks that have been sampled since a last valid presentation time stamped data block and wherein designating the sample as including a valid presentation time comprises setting a timestamp_valid field for the sample to 1, the instructions further executable to set the timestamp_valid field for the sample to 0 responsive to determining that the sum is less than the threshold value.

3. The device of claim 1, wherein the communication interface comprises an Ethernet Audio/Video Bridging (AVB) communication interface configured to transmit the audio/video stream to the other device over an Ethernet AVB network and wherein the threshold value is based on a number of data blocks between two successive valid presentation times in the audio/video stream.

4. The device of claim 1, wherein the valid presentation time comprises a sum of a time stamp and a constant, the time stamp denoting a time at which the sample was presented to the communication interface and the constant representing a max transit time indicating a worst-case network latency.

5. The device of claim 4, wherein the constant is determined based on a delay between the device and the other device.

6. The device of claim 1, wherein the instructions are further executable to store initial configuration and transient communication parameters corresponding to one or more of the communication interface, the other device, and a network over which data is transmitted from the device to the other device in non-volatile memory responsive to receiving a request to enter a lower power mode and prior to entering the lower power mode.

7. The device of claim 6, wherein the initial configuration and transient communication parameters include group precision time protocol (gPTP) and stream reservation protocol (SRP) parameters.

8. The device of claim 6, wherein the instructions are further executable to read the stored initial configuration and transient communication parameters from the non-volatile memory responsive to detecting a trigger to enter a higher power mode.

9. The device of claim 8, wherein the instructions are further executable to compare each of the stored initial configuration and transient communication parameters to an associated parameter threshold and perform a handshaking routine with a listener to acquire one or more new initial configuration and transient communication parameters responsive to determining that one of the stored initial configuration and transient communication parameters exceeds the associated parameter threshold.

10. The device of claim 9, wherein acquiring the one or more new initial configuration and transient communication parameters includes one or more of performing an SRP handshake, executing a gPTP Best Master Clock Algorithm (BMCA), and performing a gPTP link delay calculation before streaming audio/video data and after detecting the trigger.

11. A communication system comprising:
a talker device including:
a transmission buffer for storing audio/video data blocks for transmission, and
a presentation time module including first instructions executable by a processor of the talker device to determine which of a plurality of data blocks in an audio/video stream are to be time stamped with a valid presentation time, and validate a presentation time of each packet that includes a data block that is validated by setting an associated timestamp validation field for that packet to a selected value based on the validation; and
a listener device communicatively connected to the talker device and configured to receive the audio/video stream from the talker device, the listener device comprising a presentation time validation module including second instructions executable by a processor of the listener device to:
evaluate a timestamp validation field for each packet of the audio/video stream to determine whether that packet includes a data block with a valid presentation time, and
present the audio/video stream in accordance with each determined valid presentation time.

12. The system of claim 11, wherein the second instructions are further executable by the processor of the listener device to store sample data from each packet of the audio/video stream that includes a data block with a valid presentation time in a location of a listener buffer based on the determined valid presentation time included in that packet.

13. The system of claim 11, wherein the listener device comprises third instructions executable by the processor of the listener device to synchronize a media clock of the listener device to a media clock of the talker device based on one or more of the determined valid presentation times.

14. The system of claim 11, wherein determining which of a plurality of data blocks in the audio/video stream are to be time stamped with the valid presentation time in the associated timestamp validation field comprises:
performing a modulus operation of a total number of data blocks processed by the presentation time module and an syt_interval value to determine a number of data blocks that have been sampled since a last valid presentation time stamped data block, the syt_interval value defining a number of data blocks between two successive valid presentation times in the audio/video stream;
determining a sum of the number of data blocks that have been sampled since a last valid presentation time stamped data block and a number of data blocks in a current sample; and
designating the sample as including a valid presentation time responsive to determining that the sum is greater than or equal to the syt_interval value.

15. The system of claim 11, wherein third instructions stored on one or more of the listener device and the talker device are further executable by a processor of one or more of the listener device and the talker device to store initial configuration and transient communication parameters in non-volatile memory of one or more of the listener device and the talker device responsive to receiving a request to enter a lower power mode.

16. The system of claim 15, wherein the third instructions are further executable to read the stored initial configuration and transient communication parameters from the non-volatile memory responsive to detecting a trigger to enter a higher power mode.

17. The system of claim 16, wherein the third instructions are further executable to compare each of the stored initial configuration and transient communication parameters to an associated parameter threshold and perform a handshaking routine with a listener to acquire one or more new initial configuration and transient communication parameters responsive to determining that one of the stored initial configuration and transient communication parameters exceeds the associated parameter threshold.

18. A method for determining which packets of an audio/video stream transmitted from a talker device to a listener device include a valid presentation time, the method comprising:
acquiring a sample of the audio/video stream;
determining a number of data blocks in the sample;
performing a modulus operation of the total number of data blocks and an syt_interval value to determine a number of data blocks that have been sampled since a last valid presentation time stamped data block, the syt_interval value defining a number of data blocks between two successive valid presentation times in the audio/video stream;
determining a sum of the number of data blocks that have been sampled since the last valid presentation time stamped data block and the number of data blocks in the sample;
encapsulating the sample in a packet; and
setting a timestamp_valid field of a header of the packet to a selected value designating the packet as including a valid presentation time responsive to determining that the number of data blocks that have been sampled since the last valid presentation time stamped data block is greater than or equal to the syt_interval value.

19. The method of claim 18, further comprising adding the number of data blocks to a total number of data blocks included in all previously acquired samples of the audio/video stream after determining the sum.

20. The method of claim 18, further comprising storing initial configuration and transient communication parameters in non-volatile memory responsive to receiving a request to enter a lower power mode and prior to entering the lower power mode and reading the stored initial configuration and transient communication parameters from the non-volatile memory responsive to detecting a trigger to enter a higher power mode.

21. A talker device comprising:
a communication interface communicatively connectable to listener device and configured to transmit data;
a processor; and
a storage device that stores instructions executable by the processor to:
designate a sample of an audio/video stream as including a valid presentation time responsive to a sum of a number of data blocks that have been sampled since a last valid presentation time stamped data block and a number of data blocks in the sample being greater than or equal to a threshold value, and wherein the instructions are further executable to store initial configuration and transient communication parameters corresponding to one or more of the communication interface, the listener device, and a network over which data is transmitted from the talker device to the listener device in non-volatile memory responsive to receiving a request to enter a lower power mode and prior to entering the lower power mode.

* * * * *